(12) United States Patent
Moyal et al.

(10) Patent No.: US 11,216,261 B1
(45) Date of Patent: Jan. 4, 2022

(54) DEPLOYMENT IN CLOUD USING DIGITAL REPLICAS

(71) Applicant: International Business Machines Corporation, Armonk, NY (US)

(72) Inventors: Shailendra Moyal, Pune (IN); Venkata Vara Prasad Karri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/113,144

(22) Filed: Dec. 7, 2020

(51) Int. Cl.
| G06Q 10/06 | (2012.01) |
| G06Q 40/00 | (2012.01) |
| G06Q 10/00 | (2012.01) |
| G06F 9/44  | (2018.01) |
| G06F 11/36 | (2006.01) |
| G06F 9/50  | (2006.01) |
| G06F 8/60  | (2018.01) |
| G06F 21/57 | (2013.01) |

(52) U.S. Cl.
CPC .............. *G06F 8/60* (2013.01); *G06F 21/577* (2013.01)

(58) Field of Classification Search
CPC ................. G06Q 10/06; G06Q 10/067; G06Q 10/06312; G06Q 10/06315; G06Q 10/06313; G06Q 40/06; G06Q 40/08; G06Q 10/063; G06Q 10/063112; G06Q 10/063114; G06Q 10/04; G06F 11/3452
See application file for complete search history.

(56) References Cited

U.S. PATENT DOCUMENTS

| 8,631,099 B2 | 1/2014 | Morgan |
| 8,739,157 B2 | 5/2014 | Ho |
| 8,904,005 B2 | 12/2014 | Ferris |
| 9,336,060 B2 | 5/2016 | Nori |
| 9,733,985 B2 | 8/2017 | Iyoob |
| 2016/0247129 A1 | 8/2016 | Song |
| 2018/0005249 A1* | 1/2018 | Dhanyamraju ........ G06N 5/022 |
| 2018/0054376 A1 | 2/2018 | Hershey |

FOREIGN PATENT DOCUMENTS

| CN | 110097325 A | 8/2019 |
| EP | 3511820 A1 | 7/2019 |

OTHER PUBLICATIONS

Bellavista et al., A Simulation Framework for Virtualized Resources in Cloud Data Center Networks, 12 pages (Year: 2019).*

(Continued)

*Primary Examiner* — Thuy Dao
(74) *Attorney, Agent, or Firm* — William H. Hartwell

(57) ABSTRACT

Methods, computer program products, and/or systems are provided that perform the following operations: obtaining data indicative of a deployment request; obtaining data feeds associated with one or more resources; simulating deployment operations using one or more digital replica models and the data feeds, wherein the deployment operations are based, at least in part, on the data indicative of the deployment request; generating deployment scenarios based, at least in part, on the simulating of deployment operations; and determining an optimal deployment plan based, at least in part, on the generated deployment scenarios.

20 Claims, 6 Drawing Sheets

PROGRAM 300

Digital Twin Modeling 320

Digital Twin Simulation Engine 330

Data Feed Collector 325

Deployment Request Module 335

Deployment Plan Generator 340

(56) References Cited

OTHER PUBLICATIONS

"IBM Maximo Asset Performance Management", IBM Watson IoT, retrieved from the Internet on Aug. 13, 2020, 5 pages, <https://www.ibm.com/products/ibm-maximo-asset-performance-management>.

Borodulin et al., "Towards Digital Twins Cloud Platform: Microservices and Computational Workflows to Rule a Smart Factory", UCC 17, Dec. 5-8, 2017, Austin, TX, USA, 3 pages, <https://doi.org/10.1145/3147213.3149234>.

Mell et al., "The NIST Definition of Cloud Computing", Recommendations of the National Institute of Standards and Technology, Special Publication 800-145, Sep. 2011, 7 pages.

\* cited by examiner

DEPLOYMENT IN CLOUD USING DIGITAL REPLICAS

BACKGROUND

The present invention relates generally to the field of digital modeling, and more particularly to providing for the utilization of digital replica (e.g., "digital twin") modeling in determinations associated with deployments (e.g., services, applications, containers, platforms, etc.), such as in cloud deployments.

A digital twin provides an exact virtual/digital replica of a physical entity (e.g., machine, product, system, process, service, and/or the like) creating a link between the physical and digital worlds. A digital twin can enable simulation, testing, modeling, analysis, and/or monitoring based on data generated by and/or collected from the digital twin.

SUMMARY

According to an aspect of the present invention, there is a method, computer program product and/or system that performs the following operations (not necessarily in the following order): obtaining data indicative of a deployment request; obtaining data feeds associated with one or more resources; simulating deployment operations using one or more digital replica models and the data feeds, wherein the deployment operations are based, at least in part, on the data indicative of the deployment request; generating deployment scenarios based, at least in part, on the simulating of deployment operations; and determining an optimal deployment plan based, at least in part, on the generated deployment scenarios.

DETAILED DESCRIPTION

Figure 1:
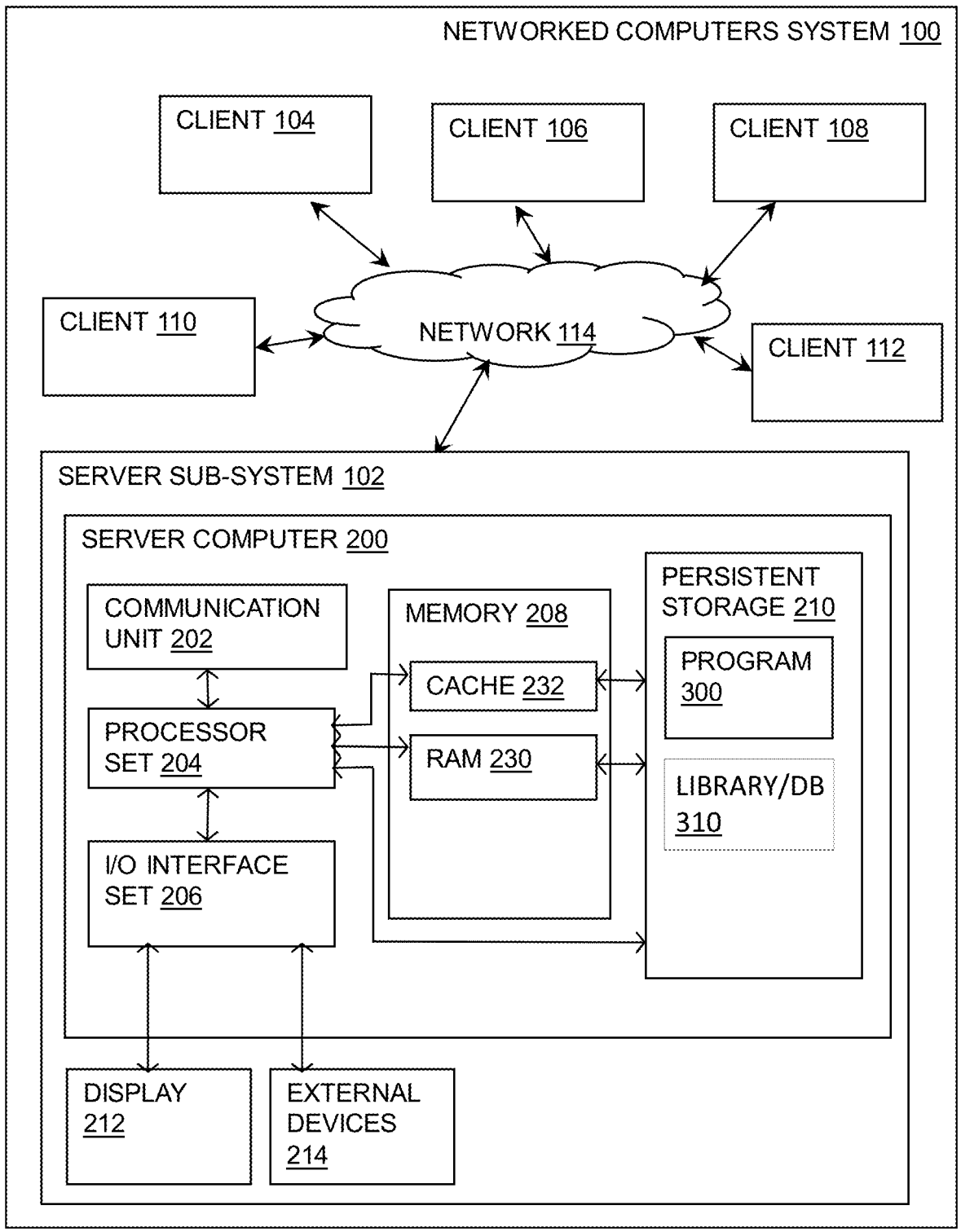
FIG. 1 is a block diagram view of a first embodiment of a system, according to the present invention.

According to aspects of the present disclosure, systems and methods can be provided to utilize digital replica (e.g., digital twin) simulation of new deployment requests (e.g., services, applications, containers, etc.), such as cloud deployments and/or the like and determine deployment plan(s) for the new deployment request. A digital replica (e.g., digital twin) provides a virtual/digital replica or representation of a physical entity (e.g., machine, product, system, process, service, and/or the like) creating a link between the physical and digital worlds. Digital replicas (e.g., digital twins) can enable modeling, simulations, testing, monitoring, and/or the like of such entities. In particular, systems and methods of the present disclosure can provide for using digital replica(s) along with real-time data feeds associated with resources and/or endpoints to simulate a new deployment request prior to actual deployment. The systems and methods of the present disclosure can provide for identifying deployment requirements and/or user context and use such data in simulating the deployment using digital replica(s). In some embodiments, the systems and methods of the present disclosure can provide for creating internal and/or external impediments with respect to infrastructure, resources, and/or the like associated with an overall deployment process and generating what-if deployment scenarios, for example associated with the identified requirements and user context based on feed data from multiple resources and/or end points.

In general, cloud deployments can be highly useful for the dynamic nature of business, allowing for serving requirements quickly with ease and resilience. With increasing demand for cloud deployment, there are different architectures that may be used (e.g., micro-services-based deployment, docker/K8 deployment, etc.) for faster, high scale deployment without any dependencies on run-time environments. However, with known and unknown changes in platforms, infrastructure, software services, and the like, run time failures for deployments may occur in the cloud environment. Accordingly, embodiments of the present disclosure can provide for using digital replicas (e.g., digital twins) to simulate a new deployment request with respect to real-time data associated with infrastructure and resources in advance of any deployment. Such embodiments can allow for determining likely deployment success/failure rates, deployment tasks, metrics, and/or the like in advance of actual deployment.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can comprise generating digital replica (e.g., digital twin) simulations, identifying deployment requirements, identifying user contexts and/or user preferences, identifying deployment resources, generating deployment tasks, identifying security issues/threats/leaks, generating deployment metrics, generating deployment scenarios, generating deployment plans/action plans, and/or the like. A library and/or database (e.g., library 310) may include substantive data associated with a plurality of digital replica (e.g., digital twin) models and may be accessed, for example by program 300, in utilizing (e.g., monitoring, controlling, generating data, analyzing, simulating, etc.) one or more digital replica (e.g., digital twin) models. Additionally and/or alternatively, a library 310 may include substantive data associated with cloud/network resources, cloud services, infrastructure, deployment resources, deployment tasks, deployment components, deployment requirements, historical deployments/ patterns data, historical deployment success/failure data, and/or the like and may be accessed, for example by program 300, in generating deployment scenarios, requirements, preferences, tasks, issues, threats, action plans, metrics, best practices, and/or the like, such as discussed herein.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2:
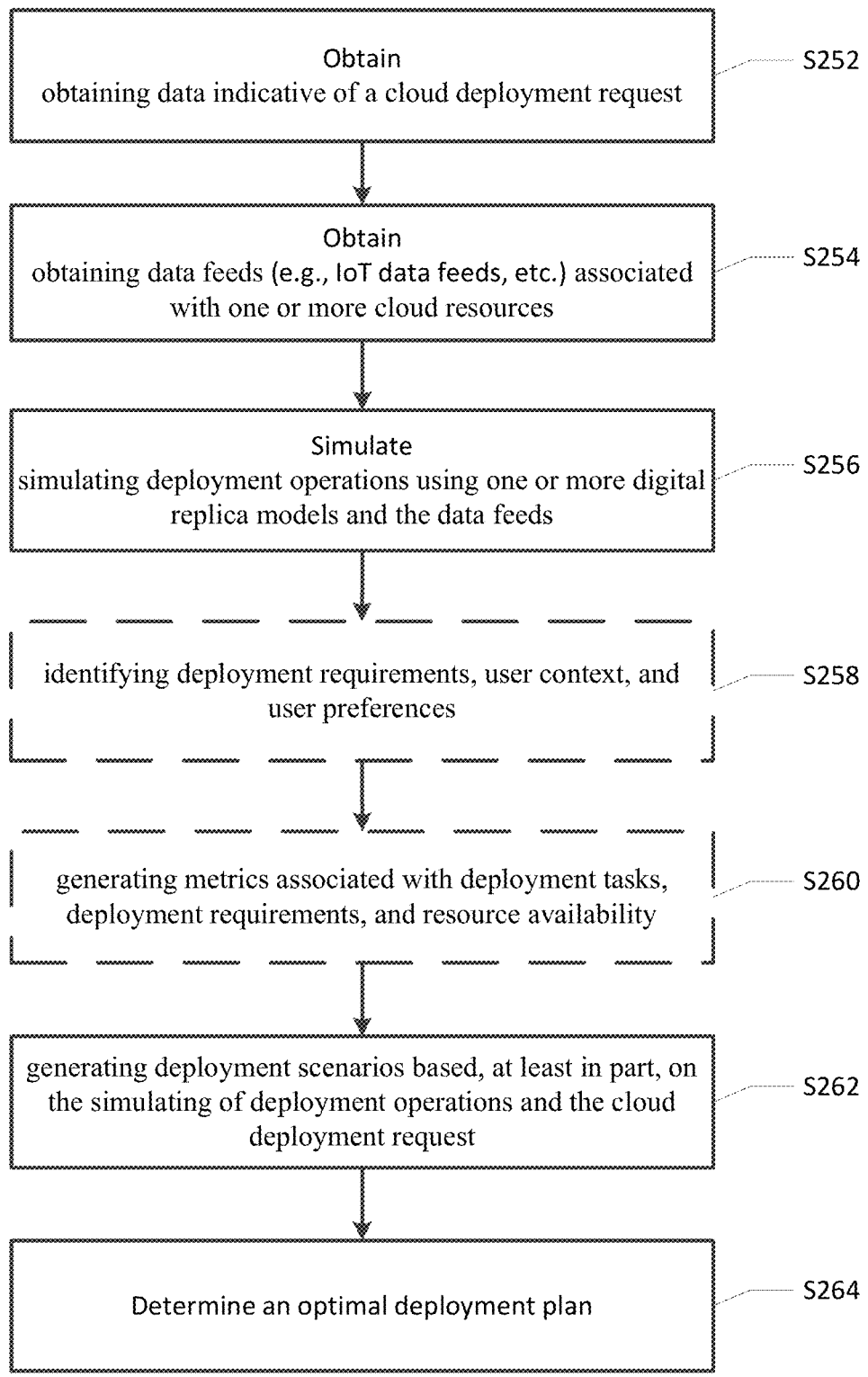
FIG. 2 is a flowchart showing a first embodiment method performed, at least in part, by the first embodiment system.
Figure 3:
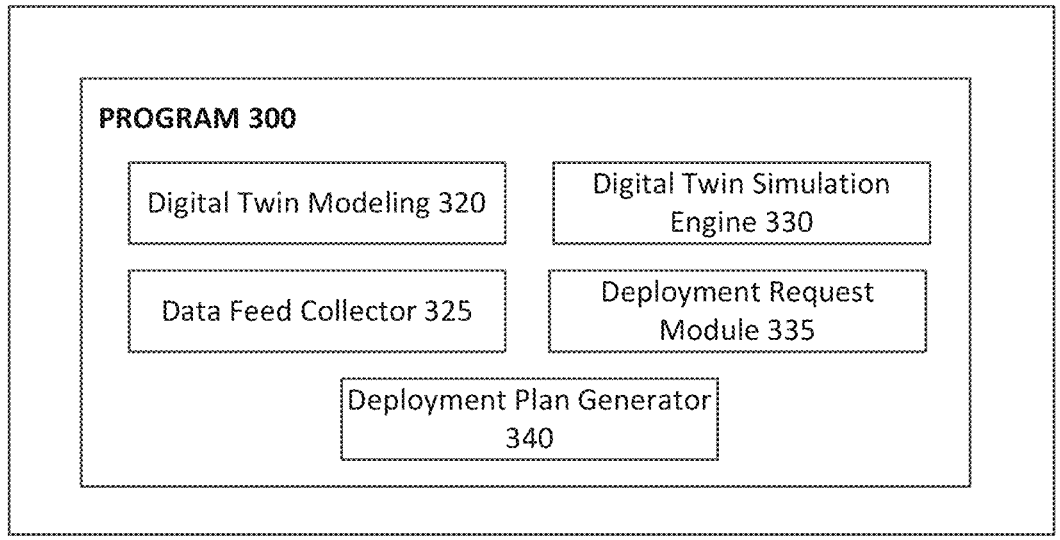
FIG. 3 is a block diagram showing an example machine logic (for example, software) portion of the first embodiment system.

FIG. 2 shows flowchart 250 depicting a computer-implemented method, according to embodiment(s) of the present invention. FIG. 3 shows a program 300 for performing at least some of the method operations of flowchart 250. Regarding FIG. 2, one or more flowchart blocks may be identified with dashed lines and represent optional steps that may additionally be included, but which are not necessarily required, in the depicted embodiments. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for determining effective deployments (e.g., cloud deployments, etc.) begin at operation S252, where a computing system (e.g., server computer 200 of FIG. 1 or the like) obtains data indicative of a new deployment (e.g., cloud deployment, etc.) request. In some embodiments, the new deployment request (e.g., cloud deployment, etc.) can include data associated with requested resources and/or dependent services for the desired deployment.

As an example, a deployment request module 335 of FIG. 3 and/or the like can provide for receiving data (e.g., from a user, etc.) requesting a new deployment (e.g., cloud deployments, etc.) that is to be completed. The deployment request module 335 can also receive data associated with the new deployment request such as requested resources, dependent services, and/or the like. In some embodiments, the deployment request module 335 can provide for any data associated with the new deployment that may assist in the simulation of the new deployment with respect to the available resources (e.g., cloud resources, etc.), infrastructure, environment, and/or the like. In some embodiments, the deployment request module 335 and/or the like may provide data associated with the new deployment request to a digital twin modeling module 320, a digital twin simulation engine 330, and/or the like for use in modeling and simulating a new deployment to allow for determining deployment success/failure scenarios, deployment tasks, recommended actions, upgrades, solutions, and/or the like in advance of the deployment execution.

Processing proceeds to operation S254, where the computing system (e.g., server computer 200 of FIG. 1 or the like) obtains data feed(s) associated with one or more resources (e.g., available cloud resources, etc.). In some embodiments, the data feed(s) can include Internet of Things (IoT) data feeds associated with the resources, infrastructure, environment, services, and/or the like. In some embodiments, the data feed(s) can be provided as real-time data feeds. As an example, a data feed collector module 325 and/or the like can provide for receiving data feeds from resources (e.g., available cloud resources, etc.), infrastructure, and/or the like, such as IoT feeds from multiple end points in a network, for example. In some embodiments, the data feed collector module 325 and/or the like can provide data associated with the data feed(s) (e.g., available resource IoT data feeds, etc.) to a digital twin modeling module 320, a digital twin simulation engine 330, and/or the like for use in modeling and simulating a new deployment (e.g., cloud deployment, etc.).

Processing proceeds to operation S256, where the computing system (e.g., server computer 200 of FIG. 1 or the like) can simulate deployment operations (e.g., task queueing, completion, failures, resource request/use, etc.) associated with the new deployment request (e.g., cloud deployment request, etc.). The computing system (e.g., server computer 200 of FIG. 1 or the like) can use one or more digital replica (e.g., digital twin) models and the data feed(s) (e.g., available resource IoT data feeds, etc.) to simulate the new deployment based, at least in part, on data associated with the new deployment request (e.g., cloud deployment request, etc.). As an example, a digital twin modeling module 320 of FIG. 3 and/or the like may access a library and/or database (e.g., library/database 310 of FIG. 1, etc.) and obtain data for a digital replica (e.g., digital twin) simulation of the new deployment (e.g., cloud deployment, etc.) based on the resources (e.g., available cloud resources, etc.), infrastructure, deployment requirements, and/or the like. In some embodiments, the digital twin modeling module 320 and/or the like can provide data associated with digital replica (e.g., digital twin) model(s) to a digital twin simulation engine 330, and/or the like for use in simulating the new deployment (e.g., cloud deployment, etc.). The digital twin simulation engine 330 and/or the like can use one or more digital replica (e.g., digital twin) model(s), the data feed(s) (e.g., real-time IoT data feeds, etc.) associated with resources, infrastructure, and/or the like (e.g., cloud resources, etc.), the deployment requirements, and/or the like to simulate the new deployment and allow for determining real-time deployment success/failure, deployment tasks, and/or the like in advance of the actual deployment.

In some embodiments, the computing system can, as part of simulating a new deployment (e.g., deployment operations, etc.), virtually impose data loads on the digital replica(s) (e.g., digital twin(s)) to determine workload conditions, such as federated or workload migration, allocation of selective workload, and/or the like.

Optionally, in some embodiments, processing may continue to operation S258, where the computing system (e.g., server computer 200 of FIG. 1 or the like) can, as part of the deployment simulation(s), identify deployment requirements, user context, and/or user preferences associated with the user and/or the new deployment request. In some embodiments, the deployment requirements, user context, and/or user preferences can be used in the simulation of the new deployment using the digital replica (e.g., digital twin) model(s). For example, in some embodiments, the computing system can auto identify (e.g., based on the new deployment request and associated data, etc.) the context of the user and/or one or more deployment requirements for use in the simulation of the new deployment using the digital replica (e.g., digital twin) model(s). In simulating the new deployment with the digital replica(s), the computing system (e.g., digital replica (digital twin) system, etc.) can determine and/or create internal and/or external impediments for the new deployment with respect to the infrastructure, resources, and/or the like (e.g., overall deployment process, etc.). The computing system (e.g., digital replica (digital twin) system, etc.) can then identify and/or generate "what-if" scenarios for the identified user and/or user context based, at least in part, on the new deployment request and data feeds (e.g., IoT feeds, etc.) from various resources/endpoints, and/or the like. In some embodiments, the computing system (e.g., digital replica (digital twin) system, etc.) can simulate the new deployment using the digital replica(s) in an integrated network setting to identify possible security issues, leaks, and/or the like.

Optionally, in some embodiments, processing may proceed to operation S260, where the computing system (e.g., server computer 200 of FIG. 1 or the like) can generate metrics (e.g., analytics-based metrics, etc.) associated with deployment tasks, deployment requirements, and/or resource availability. In some embodiments, the metrics can be used in generating deployment scenarios based on simulation of the new deployment (e.g., deployment operations simulation, etc.). In some embodiments, the metrics may be used in determining an optimal deployment plan and/or deployment action plans that may assist in achieving higher deployment success ratios and/or minimize deployment failure scenarios. In some embodiments, the generated metrics may assist in design development, for example, based on classification done for run time environment of deployment tasks. As an example, in some embodiments, the computing system (e.g., digital replica (digital twin) system, etc.) can assist in identifying and/or generate metrics about deployment tasks as: high importance to make service available (functional requirement), high importance to make service available (non-functional requirement), should be needed but can be enabled later when resource(s) are needed—independent (functional requirement), should be needed but can be enabled later when resource(s) are needed—independent (non-functional requirement), and/or the like.

Processing proceeds to operation S262, where the computing system (e.g., server computer 200 of FIG. 1 or the like) can generate one or more deployment scenarios based, at least in part, on the simulation of the new deployment (e.g., deployment operations, etc.) and the new deployment request (e.g., cloud deployment, etc.). As an example, a deployment plan generator 340 and/or the like can obtain data regarding the new deployment simulation(s) (e.g., from a digital twin simulation engine 330, etc.) and identify and/or generate deployment scenarios based on, for example, internal and/or external impediments for the new deployment with respect to the infrastructure, resources, etc.; identifying possible security issues, leaks, etc.; and/or the like. The computing system (e.g., digital replica (digital twin) system, etc.) can provide data regarding likely deployment success scenarios, likely deployment failure scenarios, and/or the like. In some embodiments, the computing system (e.g., digital replica (digital twin) system, etc.) can determine one or more deployment tasks and/or divide up deployment tasks (e.g., functional, non-functional, etc.) associated with the new deployment, for example, as part of the deployment scenario generation. In some embodiments, the deployment scenarios can identify portions of a new deployment request (e.g., deployment tasks, etc.) that can be deployed currently and portions that can be queued for later. In some embodiments, the computing system (e.g., digital replica (digital twin) system, etc.) can generate action plan(s) for the new deployment based on the identified deployment tasks, possible security issues, and/or the like. In some embodiments, the computing system (e.g., digital replica (digital twin) system, etc.) can generate deployment scenarios based, in part, on generated metrics (e.g., analytics-based metrics, etc.) associated with deployment tasks, deployment requirements, and/or resource availability.

Processing proceeds to operation S264, where the computing system (e.g., server computer 200 of FIG. 1 or the like) can determine an optimal deployment plan based, at least in part, on the generated deployment scenarios (e.g., likely success/failure, deployment tasks, security issues, etc.). An optimal deployment plan for a new deployment request (e.g., cloud deployment, etc.) may allow for achieving higher deployment success ratios and/or minimizing deployment failure scenarios. As an example, a deployment plan generator 340 and/or the like can determine an optimal new deployment plan (e.g., action plan(s), etc.) from the generated deployment scenarios. In some embodiments, an optimal deployment plan may identify deployment level distribution tasks, independent tasks, areas for improvement, and/or the like associated with the new deployment request in advance of actual deployment.

Further Comments and/or Embodiments

Additionally, some embodiments of the present disclosure can include machine learning models that may store mapping(s) of network resources (e.g., cloud resources, etc.), historical deployment data, and/or the like which may be used in the simulation of a new deployment and determination of deployment scenarios (e.g., success/failure scenarios, etc.), action plan(s), optimal deployment plan, and/or the like. Accordingly, in some embodiments, a computing system (e.g., server computer 200 of FIG. 1 or the like) can obtain historical data representative of deployment successes/failures, success/failure ratios, associated patterns and deployments, and/or the like. The computing system can provide such historical data to one or more machine learning models which can provide output to assist in in simulating the new deployment (e.g., deployment operations, etc.) and determining deployment scenarios, deployment plans, and/or the like.

Additionally, in some embodiments, a computing system (e.g., server computer 200 of FIG. 1 or the like) may provide for performing feedback ingestion of data based on the simulation of the new deployment and the generation of deployment scenarios. The computing system may allow for generating one or more recommended solutions, deployment best practices, recommended upgrades for hardware, software, or services, references to ingest into the model, and/or the like.

Figure 4:
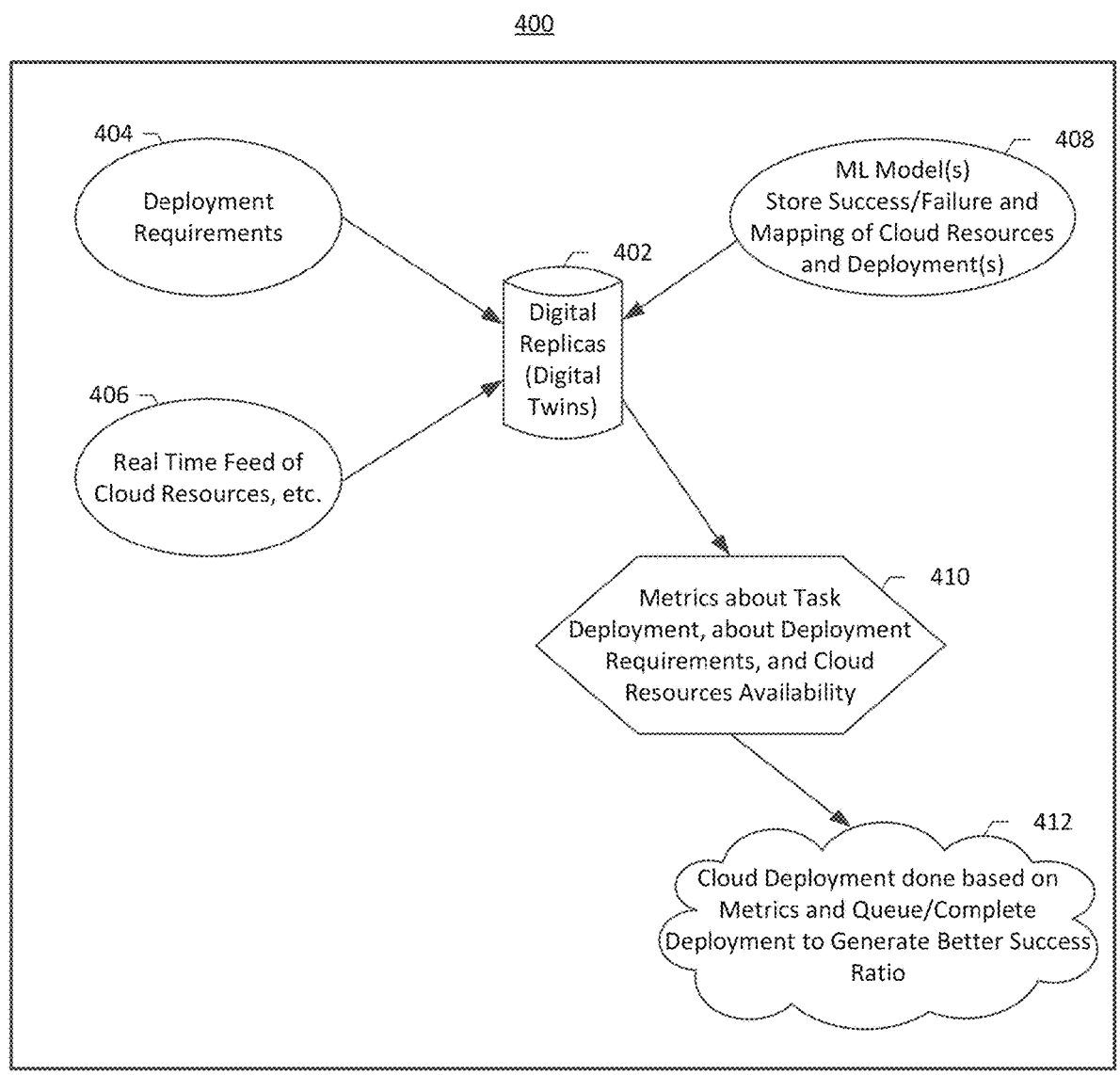
FIG. 4 is a block diagram showing an example architecture for deployment modeling using digital replicas, according to embodiments of the present invention.

FIG. 4 is a block diagram showing an example architecture 400 for deployment modeling/simulation using digital replicas, according to the present invention. As illustrated in FIG. 4, in some embodiments, an architecture 400 for digital replica simulation of new deployments may include a digital replica (e.g., digital twin) system 402; deployment requirement(s) 404, data feeds 406 (e.g., real-time feeds of resources/endpoints, etc.), and machine learning model(s) 408.

In some embodiments, the digital replica (e.g., digital twin) system 402 can obtain data associated with the deployment requirements 404 (e.g., for a new deployment request, etc.). For example, a user can provide data associated with a new deployment request. The new deployment request can include one or more deployment requirements 404, such as requested resources, dependent services, and/or the like. In some embodiments, the digital replica system 402 may also automatically identify additional deployment requirements, user preferences, user context and/or the like. The digital replica system 402 can obtain data feeds 406. The data feeds 406 can include real-time data feeds that are associated with one or more resources (e.g., cloud resources, network resources, etc.), endpoints, and/or the like. In some embodiments, the data feeds 406 can include IoT data feeds associated with the resources, infrastructure, environment, services, and/or the like. Additionally, in some embodiments, the digital replica system 402 can obtain output of machine learning models 408. The machine learning models 408 can provide data associated with deployment success/failure rates, prior deployment data, mapping of resources, and/or the like.

The digital replica system 402 can use the deployment requirements 404, the data feeds 406, and/or the output of machine learning models 408 to simulate the new deployment request, based, at least in part, on data associated with the new deployment request. As an example, the digital replica system 402 may access a library and/or database to obtain data for a digital replica simulation of the new deployment (e.g., cloud deployment, etc.) based on the resources, infrastructure, deployment requirements, data feeds, and/or the like. The digital replica system 402 can simulate the new deployment and allow for determining real-time deployment success/failure, deployment tasks, and/or the like in advance of actual deployment. In some embodiments, the digital replica system 402 may identify deployment requirements, user context, and/or user preferences associated with the user and/or the new deployment request as part of the deployment simulations. The digital replica system 402 can provide for generating metrics 410, for example, associated with deployment tasks, deployment requirements, resource availability, and/or the like, based on the new deployment simulation, deployment requirements, data feeds, and/or the like. In some embodiments, the metrics 410 may be used in determining an optimal deployment plan and/or deployment action plans that may assist in achieving higher deployment success ratios and/or minimize deployment failure scenarios.

The digital replica system 402 can generate one or more deployment scenarios based on the simulation(s) of the new deployment, the generated metrics 410, and/or the like. For example, the digital replica system 402 can determine and/or create internal and/or external impediments for the new deployment (e.g., overall deployment process) with respect to the infrastructure, resources, and/or the like. The digital replica system 402 can identify and/or generate "what-if" scenarios for the identified user and/or user context based, at least in part, on the new deployment request and data feeds (e.g., IoT feeds, etc.) from various resources/endpoints, and/or the like. In some embodiments, digital replica system 402 can determine one or more deployment tasks and/or divide up deployment tasks (e.g., functional, non-functional, etc.) associated with the new deployment, for example, as part of the deployment scenario generation. In some embodiments, the deployment scenarios can identify portions of a new deployment request (e.g., deployment tasks, etc.) that can be deployed currently and portions that can be queued for later. In some embodiments, the digital replica system 402 can generate action plan(s) for the new deployment based on the identified deployment tasks, possible security issues, and/or the like.

The digital replica system 402 can determine a deployment plan 412 (e.g., optimal/best deployment plan, etc.) to complete and/or queue deployment tasks based on the deployment scenarios (e.g., likely success/failure, deployment tasks, security issues, etc.) and generated metrics 410. that may allow for improved deployment success rates. The deployment plan 412 for a new deployment request (e.g., cloud deployment, etc.) may allow for achieving higher deployment success ratios and/or minimizing deployment failure scenarios. In some embodiments, the deployment plan 412 may identify deployment level distribution tasks, independent tasks, areas for improvement, and/or the like associated with the new deployment request in advance of deployment.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, services, etc.) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
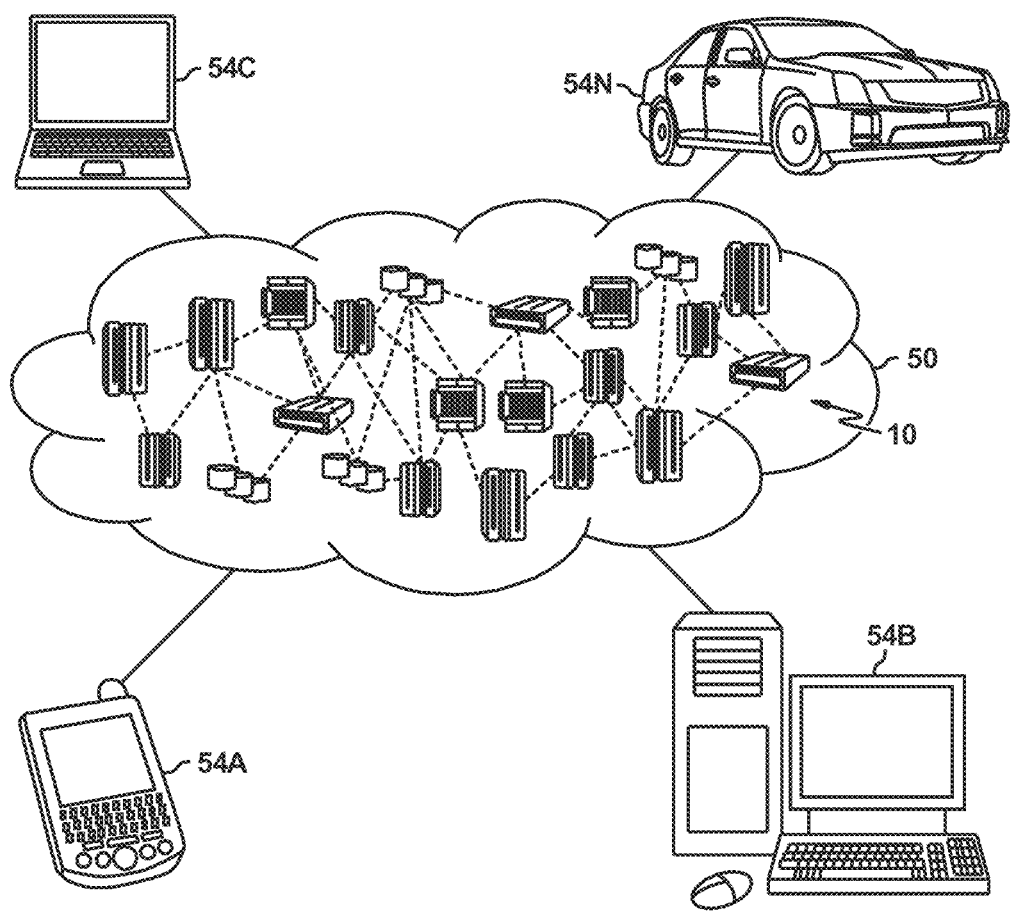
FIG. 5 depicts a cloud computing environment, according to embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
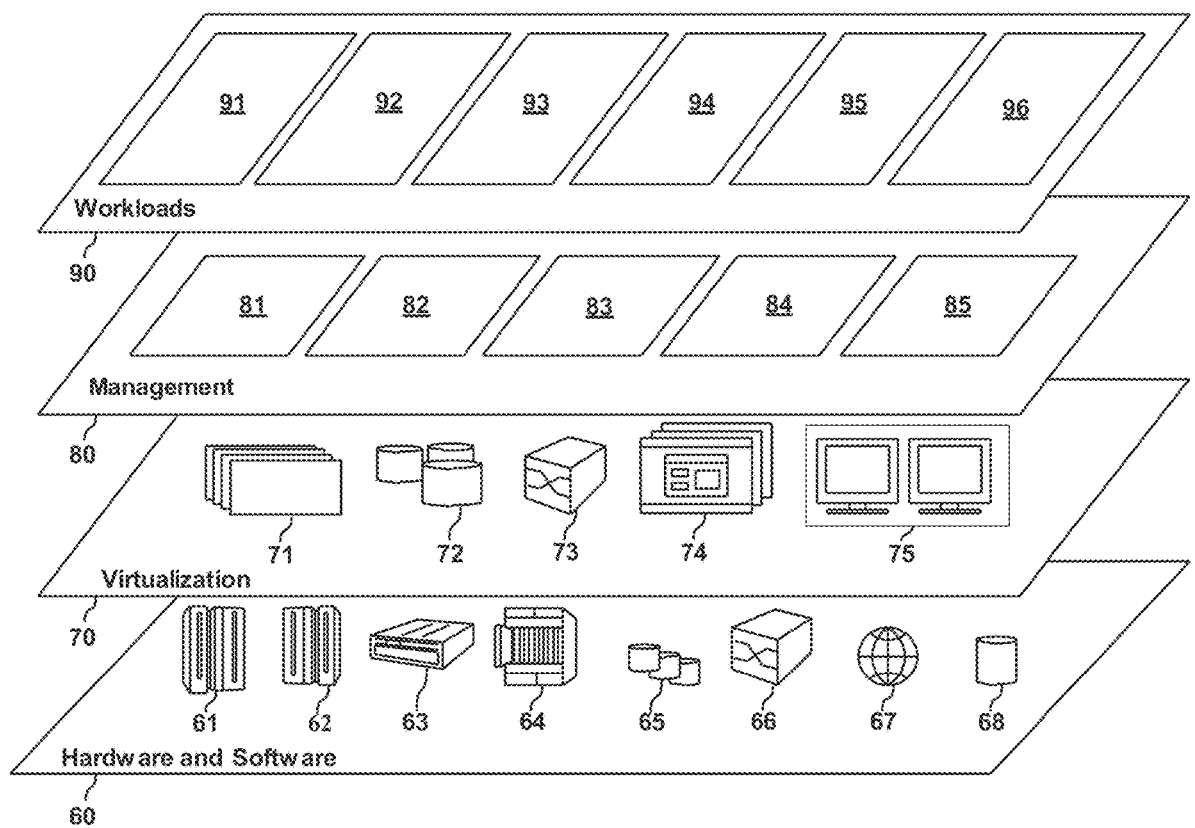
FIG. 6 depicts abstraction model layers, according to embodiments of the present invention.

Referring now to FIG. 6, a set of functional abstraction layers provided by cloud computing environment 50 (of FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and services/application deployment 96.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
obtaining data indicative of a deployment request;
obtaining data feeds associated with one or more resources;
simulating deployment operations using one or more digital replica models and the data feeds, wherein the deployment operations are based, at least in part, on the data indicative of the deployment request;
generating deployment scenarios based, at least in part, on the simulating of deployment operations; and
determining an optimal deployment plan based, at least in part, on the generated deployment scenarios.

2. The computer-implemented method of claim 1, wherein the simulating of deployment operations further comprises identifying deployment requirements.

3. The computer-implemented method of claim 2, wherein the simulating deployment operations further comprises identifying user context and user preferences; and
wherein the generating of deployment scenarios is further based, at least in part, on the user context and the user preferences.

4. The computer-implemented method of claim 1, wherein the simulating deployment operations further comprises determining internal and external impediments for an overall deployment process with respect to network infrastructure and the one or more resources.

5. The computer-implemented method of claim 1, wherein the simulating deployment operations further comprises identifying possible security issues for use in the generating of deployment scenarios.

6. The computer-implemented method of claim 1, further comprising generating metrics associated with deployment tasks, deployment requirements, and resource availability, wherein the generating of deployment scenarios and the determining of the optimal deployment plan are based, at least in part, on the metrics generated.

7. The computer-implemented method of claim 1, wherein the generating of deployment scenarios further comprises determining one or more deployment tasks along with any associated possible security issues for use in generating action plans for the optimal deployment plan.

8. The computer-implemented method of claim 1, further comprising:
performing feedback ingestion based on the simulating of deployment operations and the generating of deployment scenarios; and
generating one or more recommended solutions, deployment best practices, and any recommended upgrades for hardware, software, or services.

9. The computer-implemented method of claim 1, further comprising:
obtaining historical data representative of success/failure ratios with associated patterns and deployments;
providing the historical data to one or more machine learning models, wherein the one or more machine learning models store mapping of resources and deployment along with associated success/failure data; and
providing output data from the one or more machine learning models for use in simulating the deployment operations using the one or more digital replica models.

10. The computer-implemented method of claim 1, wherein the simulating deployment operations further comprises virtually imposing data loads on the one or more digital replica models to determine workload conditions.

11. A computer program product comprising a computer readable storage medium having stored thereon:
program instructions programmed to obtain data indicative of a deployment request;
program instructions programmed to obtain data feeds associated with one or more resources;
program instructions programmed to simulate deployment operations using one or more digital replica models and the data feeds, wherein the deployment operations are based, at least in part, on the data indicative of the deployment request;
program instructions programmed to generate deployment scenarios based, at least in part, on the simulating of deployment operations; and
program instructions programmed to determine an optimal deployment plan based, at least in part, on the generated deployment scenarios.

12. The computer program product of claim 11, wherein the simulating of deployment operations further comprises identifying deployment requirements and user context.

13. The computer program product of claim 11, wherein the simulating deployment operations further comprises determining internal and external impediments for an overall deployment process with respect to network infrastructure and the one or more resources.

14. The computer program product of claim 11, wherein the simulating deployment operations further comprises identifying possible security issues for use in the generating of deployment scenarios.

15. The computer program product of claim 11, the computer readable storage medium having further stored thereon:
program instructions programmed to generate metrics associated with deployment tasks, deployment requirements, and resource availability, wherein the generating of deployment scenarios and the determining of the optimal deployment plan are based, at least in part, on the metrics generated.

16. The computer program product of claim 11, wherein the generating of deployment scenarios further comprises determining one or more deployment tasks along with any associated possible security issues for use in generating action plans for the optimal deployment plan.

17. A computer system comprising:
a processor set; and
a computer readable storage medium;
wherein:
the processor set is structured, located, connected and programmed to run program instructions stored on the computer readable storage medium; and
the stored program instructions include:
program instructions programmed to obtain data indicative of a deployment request;
program instructions programmed to obtain data feeds associated with one or more resources;
program instructions programmed to simulate deployment operations using one or more digital replica models and the data feeds, wherein the deployment operations are based, at least in part, on the data indicative of the deployment request;
program instructions programmed to generate deployment scenarios based, at least in part, on the simulating of deployment operations; and
program instructions programmed to determine an optimal deployment plan based, at least in part, on the generated deployment scenarios.

18. The computer system of claim 17, wherein the simulating deployment operations further comprises determining internal and external impediments for an overall deployment process with respect to network infrastructure and the one or more resources.

19. The computer system of claim 17, wherein the stored program instructions further include:
program instructions programmed to generate metrics associated with deployment tasks, deployment requirements, and resource availability, wherein the generating of deployment scenarios and the determining of the optimal deployment plan are based, at least in part, on the metrics generated.

20. The computer system of claim 17, wherein the generating of deployment scenarios further comprises determining one or more deployment tasks along with any associated possible security issues for use in generating action plans for the optimal deployment plan.

\* \* \* \* \*